United States Patent
Inoda et al.

(10) Patent No.: US 9,597,663 B2
(45) Date of Patent: Mar. 21, 2017

(54) EXHAUST CLEANING CATALYST

(71) Applicant: CATALER CORPORATION, Kakegawa-shi, Shizuoka (JP)

(72) Inventors: Satoru Inoda, Kakegawa (JP); Akimasa Hirai, Kakegawa (JP); Kenichi Taki, Kakegawa (JP); Satoshi Matsueda, Kakegawa (JP)

(73) Assignee: CATALER CORPORATION, Shizuoka (JP)

( * ) Notice: Subject to any disclaimer, the term of this patent is extended or adjusted under 35 U.S.C. 154(b) by 0 days.

(21) Appl. No.: 15/030,448

(22) PCT Filed: Dec. 8, 2014

(86) PCT No.: PCT/JP2014/082431
§ 371 (c)(1),
(2) Date: Apr. 19, 2016

(87) PCT Pub. No.: WO2015/087836
PCT Pub. Date: Jun. 18, 2015

(65) Prior Publication Data
US 2016/0236181 A1 Aug. 18, 2016

(30) Foreign Application Priority Data
Dec. 11, 2013 (JP) ................. 2013-255878

(51) Int. Cl.
*B01J 23/00* (2006.01)
*B01J 23/10* (2006.01)
(Continued)

(52) U.S. Cl.
CPC .......... *B01J 23/464* (2013.01); *B01D 53/945* (2013.01); *B01J 23/58* (2013.01); *B01J 23/63* (2013.01);
(Continued)

(58) Field of Classification Search
CPC . B01J 23/464; B01J 23/63; B01J 23/58; B01J 35/04
(Continued)

(56) References Cited

U.S. PATENT DOCUMENTS

| | | | |
|---|---|---|---|
| 4,927,799 A | 5/1990 | Matsumoto et al. | |
| 4,957,896 A | 9/1990 | Matsumoto et al. | |

(Continued)

FOREIGN PATENT DOCUMENTS

| | | | |
|---|---|---|---|
| JP | S63-116741 A | 5/1988 | |
| JP | H01-242149 A | 9/1989 | |

(Continued)

OTHER PUBLICATIONS

Machine Translation of JP2000140644 originally published on May 23, 2000.*

*Primary Examiner* — Colleen Dunn
*Assistant Examiner* — Haytham Soliman
(74) *Attorney, Agent, or Firm* — Oliff PLC

(57) ABSTRACT

An exhaust cleaning catalyst, with which precious metal sintering is inhibited and which has greater exhaust cleaning abilities, has a substrate and a catalyst coating layer provided on the substrate. The catalyst coating layer has a precious metal that serves as an oxidation and/or reduction catalyst. The precious metal has Rh-containing metal particles in which rhodium (Rh) coexists with a base metal selected among platinum group elements excluding rhodium. The Rh-containing metal particles have an average rhodium content of 0.1% to 5% by mole with the total amount of the base metal and rhodium being 100% by mole.

12 Claims, 3 Drawing Sheets

*The values in parentheses indicate the coexistence ratios (%).

(51) Int. Cl.
*B01J 23/46* (2006.01)
*B01J 23/63* (2006.01)
*B01D 53/94* (2006.01)
*B01J 23/58* (2006.01)
*B01J 35/04* (2006.01)

(52) U.S. Cl.
CPC ....... *B01J 35/04* (2013.01); *B01D 2255/1023* (2013.01); *B01D 2255/1025* (2013.01); *B01D 2255/9202* (2013.01); *Y02T 10/22* (2013.01)

(58) Field of Classification Search
USPC ......... 502/64, 66, 326, 328, 330; 423/213.5, 423/212, 213.2, 239.1, 239.2, 213.7
See application file for complete search history.

(56) References Cited

U.S. PATENT DOCUMENTS

| | | |
|---|---|---|
| 6,165,429 A | 12/2000 | Ikeda et al. |
| 2005/0233897 A1 | 10/2005 | Tanaka et al. |
| 2005/0245391 A1 | 11/2005 | Tanaka et al. |

FOREIGN PATENT DOCUMENTS

| | | |
|---|---|---|
| JP | H06-75675 B2 | 9/1994 |
| JP | H09-253490 A | 9/1997 |
| JP | H10-192707 A | 7/1998 |
| JP | H10-202101 A | 8/1998 |
| JP | 2000-140644 A | 5/2000 |
| JP | 2004-041866 A | 2/2004 |
| JP | 2004-041867 A | 2/2004 |
| JP | 2004-041868 A | 2/2004 |
| JP | 2007-185571 A | 7/2007 |
| JP | 2010-005501 A | 1/2010 |
| JP | 2013-220377 A | 10/2013 |

\* cited by examiner

*The values in parentheses indicate the coexistence ratios (%).

EXHAUST CLEANING CATALYST

TECHNICAL FIELD

The present invention relates to an exhaust cleaning catalyst provided to an exhaust system of an internal combustion engine. In particular, it relates to an exhaust cleaning catalyst comprising Rh-containing metal particles in which rhodium coexist with a base metal selected from platinum group metals excluding rhodium.

The present application claims priority to Japanese Patent Application No. 2013-255878 filed on Dec. 11, 2013; and the entire contents of which are incorporated herein by reference.

BACKGROUND ART

Exhaust expelled from internal combustion engines such as automobile engines includes toxic components such as hydrocarbons (HC), carbon monoxide (CO), nitrogen oxides ($NO_x$), etc. To efficiently eliminate these exhaust components, exhaust cleaning catalysts are used. An exhaust cleaning catalyst comprises a catalyst coating layer formed of a precious metal serving as the catalyst carried (supported) on a carrier or present as a solid solution with the carrier. As the precious metal, for instance, precious metals belonging to the platinum group (PGM) such as rhodium (Rh), palladium (Pd) and platinum (Pt) are used.

There are problems with these exhaust cleaning catalysts, such that their cleaning abilities decrease as the precious metal gradually degrades with the use. One of the main reasons for this is the sintering of the precious metals. In particular, upon exposure to exhaust at a high temperature (e.g. 800° C. to 1000° C.), the precious metal undergoes grain growth, resulting in a decrease in specific surface area (active spots) of the precious metal. As for the techniques to deal with such problems, for instance, Patent Documents 1 to 6 disclose preventing the degradation of precious metal by means of inhibiting the sintering of the "carrier."

CITATION LIST

Patent Literature

[Patent Document 1] Japanese Patent Application Publication No. H1-242149
[Patent Document 2] Japanese Patent Application Publication No. S63-116741
[Patent Document 3] Japanese Patent Application Publication No. H10-202101
[Patent Document 4] Japanese Patent Application Publication No. 2004-041866
[Patent Document 5] Japanese Patent Application Publication No. 2004.041867
[Patent Document 6] Japanese Patent Application Publication No. 2004-041868
[Patent Document 7] Japanese Patent Application Publication No, 2013-220377
[Patent Document 8] Japanese Patent Application Publication No. 2010-5501
[Patent Document 9] Japanese Patent Application Publication No. H9-253490

SUMMARY OF INVENTION

The studies by the present inventors, however, revealed that the precious metal itself also had room for improvement in inhibiting the sintering.

The present invention has been made in view of such circumstances and an objective thereof is to provide an exhaust cleaning catalyst with which the precious metal sintering is inhibited to a greater extent and which has greater exhaust cleaning abilities.

The present inventors have earnestly studied to achieve the objective and completed this invention.

In particular, this invention provides an exhaust cleaning catalyst that is placed in an exhaust pipe of an internal combustion system such as an automobile engine and cleans exhaust expelled from the internal combustion system. The exhaust cleaning catalyst comprises a substrate and a catalyst coating layer on the substrate. The catalyst coating layer comprises a precious metal that serves as an oxidation and/or reduction catalyst and a carrier that carries the precious metal. The precious metal comprises Rh-containing metal particles in which rhodium (Rh) coexists with a base metal selected among platinum group elements excluding rhodium. In the Rh-containing metal particles, the average rhodium content is 0.1% to 5% by mole with the total amount of the base metal and rhodium being 100% by mole based on energy dispersive X-ray spectrometry analysis of a scanning transmission electron microscopy image.

Before exposed to a high temperature (e.g. 800° C. to 1000° C.) (e.g. before installed and used in an internal combustion system), the Rh-containing metal particles are in a form where the rhodium (Rh) coexists in the base metal. After exposed to a high temperature (e.g. after placed and used in an internal combustion system), in the Rh-containing metal particles, some of the base metal and rhodium (Rh) form an alloy. The use of the Rh-containing metal capable of undergoing such a change of form allows for effective inhibition of precious metal sintering. As a result, the catalytic cleaning abilities (e.g. HC-cleaning ability and/or CO-cleaning ability) can be increased.

As for the documents of conventional art related to improvement of precious metals, Patent Documents 7 to 9 are cited.

In this description, to "coexist" means that two different metal species (a base metal and Rh) form a particle without forming an alloy. In typical, it means that each one of the Rh-containing metal particles has two metal phases (crystal phases), that is, a crystal phase of the base metal and a crystal phase of Rh. The data of the crystal phases constituting a particle can be obtained, for instance, by scanning transmission electron microscope (STEM)/crystal structure analysis.

For example, when using a simple mixture of two or more species of precious metal particles (e.g. Pd particles and Rh particles), the ratio of the Pd crystal phase is approximately 100% in the Pd particles while the ratio of the Rh crystal phase is approximately 100% in the Rh particles. For example, when using particles of an alloy of two or more species of precious metal, the ratio of the alloy crystal phase is approximately 100% in the alloy particles. In other words, no two metal crystal phases exist in one particle. That is, the coexistence ratio of precious metal is 0% in conventional exhaust cleaning catalysts. Thus, by determining whether, in one particle, only one crystal phase exists or base metal and Rh crystal phases coexist, it is possible to determine whether or not they are the "Rh-containing metal particles in which rhodium (Rh) coexists in the base metal" disclosed herein.

In this description, the "average rhodium content" refers to the average coexistence ratio of rhodium in the Rh-containing metal particles, which is obtained based on scanning transmission electron microscope (STEM)/energy dispersive X-ray spectroscopy (EDX). In particular, an arbitrary particle of the Rh-containing metal (arbitrary Rh-containing metal particle) is observed at a prescribed magnification by STEM. The resulting STEM image is then subjected to elemental mapping by EDX to determine the amount (% by mole) of the base metal and the amount (% by mole) of rhodium, respectively. The content (i.e. coexistence ratio) of rhodium in the Rh-containing metal particle (in the one particle) is determined from the next equation: average rhodium content (% by mole)=(amount of rhodium)/(amount of base metal+amount of rhodium)×100. This is determined for several arbitrary Rh-containing metal particles and their arithmetic average value after statistical processing is referred to as the "average rhodium content."

In a preferable embodiment of the exhaust cleaning catalyst disclosed herein, the base metal is palladium. In other words, the precious metal comprises Pd/Rh-containing metal particles.

In the actual use of an internal combustion system (e.g. when driving an automobile), it is difficult to continuously maintain the gas mixture at a near-stoichiometric air-fuel ratio (theoretical air-fuel ratio: A/F=14.6). For example, depending on the driving conditions of the automobile, etc., the air fuel ratio of the gas mixture can be in excess of fuel (rich: A/F<14.6) or in excess of oxygen (lean: A/F>14.6). According to the studies by the present inventors, because of the relatively low melting point of palladium, exposure to a rich atmosphere in a high temperature environment causes sintering, likely leading to a tendency of the cleaning abilities to decrease. Thus, for instance, when a Pd/Rh-containing metal is used in place of palladium, the present invention is particularly effective.

In a preferable embodiment of the exhaust cleaning catalyst disclosed herein, the average rhodium content is 1% to 3% by mole.

With the average rhodium content being in this range, the cleaning abilities (especially the HC-cleaning ability and/or CO-cleaning ability) can be increased particularly in a rich atmosphere. Thus, the effects of this invention can be produced to a high level.

In a preferable embodiment of the exhaust cleaning catalyst disclosed herein, the Rh-containing metal particles have an average particle diameter of 1 nm to 5 nm based on scanning transmission electron microscopy.

Having a relatively small average particle diameter, the Rh-containing metal particles can be uniformly dispersed on a carrier. This can secure a specific surface area (active spots), allowing the precious metal to exhibit sufficient catalytic activity. It can also inhibit sintering of the precious metal and reduce the lowering of the catalytic activity.

In this description, the term "average particle diameter" refers to the arithmetic average value of particle diameters determined by STEM analysis. In particular, several arbitrary particles (Rh-containing metal particles) are analyzed by STEM. Based on the resulting STEM image, for the several respective arbitrary particles, particle diameters are determined from the next equation: particle diameter=$(D_L+D_S)/2$ (wherein, $D_L$ is the length of the longest straight line that can be drawn from one point on the particle's outline to another point thereon; and $D_S$ is the length of the shortest straight line that can be drawn from one point on the particle's outline to another point thereon). The arithmetic average value of the particle diameters obtained is referred to as the "average particle diameter."

In a preferable embodiment of the exhaust cleaning catalyst disclosed herein, the carrier comprises an alumina-based oxide and/or a ceria-zirconia-based composite oxide.

The alumina-based oxide has a relatively large specific surface area (referring to the specific surface area measured by a nitrogen adsorption method (BET method) and it also has excellent heat resistance. Thus, the precious metal can be carried, favorably dispersed; and the sintering of the precious metal can be greatly inhibited even at a high temperature (e.g. 800° C. to 1000° C.).

The ceria-zirconia-based composite oxide has high oxygen storage capacity (OSC). Accordingly, the width of the window for catalytic cleaning (the air-fuel ratio (A/F) range where cleaning is possible) can be broadened, bringing about greater cleaning abilities.

In addition to the alumina-based oxide and/or the ceria-zirconia-based composite oxide, the carrier may further comprise a rare earth oxide and/or an alkaline earth metal oxide.

The rare earth oxide and alkaline earth metal oxide has high affinities to precious metals (e.g. rhodium); and therefore, it can greatly reduce the movement of the precious metals, inhibiting the sintering to a great extent. Thus, they can be preferably used as stabilizers. By this, the effects of this invention can be produced to a higher level.

In a preferable embodiment of the exhaust cleaning catalyst disclosed herein, the precious metal comprises elemental Rh particles (Rh-only particles) in addition to the Rh-containing metal particles. In such an embodiment, the ratio of the number of moles of the coexisting Rh particles in the Rh-containing metal particles to the number of moles of the elemental Rh particles can be about 0.001 to 0.4. By this, the effects of this invention can be produced to a higher level.

DESCRIPTION OF EMBODIMENTS

Figure 1:
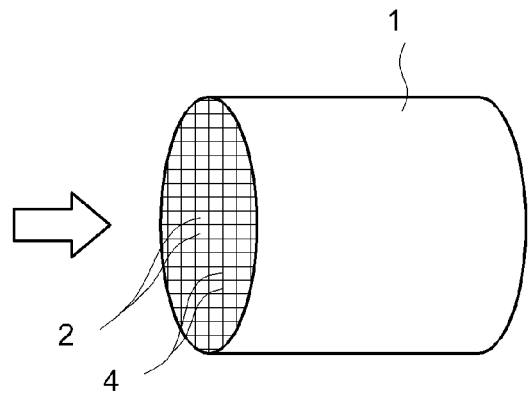
FIG. 1 shows a perspective view schematically illustrating the exhaust cleaning catalyst according to an embodiment.

With suitable reference to the drawings, preferable embodiments of the present invention are described below. In the drawings referenced below, a common reference numeral may be assigned to members or sites producing the same effects, and duplicated descriptions may be sometimes omitted or simplified. The dimensional relationship (length, width, thickness, etc.) in each drawing does not represent the actual dimensional relationship. Matters (e.g. general production methods for exhaust cleaning catalysts, etc.) necessary to practice this invention other than those specifically referred to in this description may be understood to a person skilled in the art as design matters based on the conventional art in the pertinent field. The present invention can be practiced based on the contents disclosed in this description and common technical knowledge in the subject field. The present invention can be practiced based on the contents disclosed in this description and common technical knowledge in the subject field.

The exhaust cleaning catalyst disclosed herein comprises a substrate and a catalyst coating layer formed on the substrate. The catalyst coating layer has a precious metal and a carrier. The exhaust cleaning catalyst disclosed herein is characterized by the precious metal comprising Rh-containing metal particles. Thus, the other components are not particularly limited. For instance, having suitably selected substrate and carrier which are described later and being molded in desirable forms in accordance with the applications, exhaust cleaning catalysts of this invention can be placed in exhaust systems (exhaust pipes) in various types of internal combustion systems, in particular, in diesel engines and gasoline engines of automobiles.

FIG. 1 shows a perspective view schematically illustrating the exhaust cleaning catalyst according to an embodiment of the invention disclosed herein. In FIG. 1, the flow direction of exhaust is indicated with the arrow mark. In particular, the left side of FIG. 1 is the upstream side of the exhaust passageways (exhaust pipe) and the right side is the downstream side of the exhaust passageways.

The exhaust cleaning catalyst shown in FIG. 1 is a so-called straight flow type exhaust cleaning catalyst. In this embodiment, exhaust cleaning catalyst 10 comprises a cylindrical honeycomb substrate 1. Honeycomb substrate 1 comprises a plurality of through holes (cells) 2 regularly laid in the axial direction of the cylinder (exhaust flow direction) and partitions (rib walls) 4 that separate the cells 2. On the rib walls 4, there is formed a catalyst coating layer (not shown in the drawing) having certain characteristics (e.g. length and thickness).

Exhaust supplied to exhaust cleaning catalyst 10 makes contact with the catalyst coating layer formed on the rib walls 4 while flowing (passing) through the passageways (cells 2) of honeycomb substrate 1. This cleans toxic components. For example, HC and CO in exhaust are oxidized by the catalytic activity of the catalyst coating layer and converted (cleaned) to water ($H_2O$) and carbon dioxide ($CO_2$). $NO_x$, for instance, is reduced by the catalytic activity of the catalyst coating layer and converted (cleaned) to nitrogen ($N_2$).

The respective components are described in order below.

<<Honeycomb Substrate 1>>

Honeycomb substrate 1 constitutes the frame of the exhaust cleaning catalyst. As the honeycomb substrate 1, various forms of substrates can be used, made of various types of materials conventionally used for this type of application. For example, substrates made of highly heat-resistant ceramic can be used, in particular, those made of oxide-based ceramic such as aluminum oxide (alumina, $Al_2O_3$), cerium oxide (ceria, $CeO_2$), titanium oxide (titania, $TiO_2$), zirconium oxide (zirconia, $ZrO_2$), and silicon oxide (silica, $SiO_2$); composite oxide-based ceramic such as cordierite ($2MgO \cdot 2Al_2O_3 \cdot 5SiO_2$); and carbide-based ceramic such as silicon carbide (SiC). Alternatively, the substrate can be made of an alloy such as stainless steel.

The form of honeycomb substrate 1 can also be the same as that of a conventional exhaust cleaning catalyst. For example, in the embodiment shown in FIG. 1, it has a cylindrical appearance. The capacity of honeycomb substrate 1 (the volume of passageways 2) is usually, but not particularly limited to, 0.01 L or greater (e.g. 0.02 L or greater, preferably 0.1 L or greater). It can be, for instance, 5 L or less (preferably 3 L or less, more preferably 2 L or less). Honeycomb substrate 1 can have a total length in the axial direction of the cylinder of usually about 10 mm to 500 mm (e.g. 50 mm to 300 mm). For the appearance of honeycomb substrate 1, instead of the cylindrical form, for example, an elliptic cylindrical form or a polygonal cylindrical form can be employed as well. Besides a honeycomb form as shown in FIG. 1, it may be in a form of foam, pellets, and so on.

<<Catalyst Coating Layer>>

The catalyst coating layer is the primary constituent of the exhaust cleaning catalyst as it provides a place for cleaning exhaust, and it comprises a porous carrier and a precious metal carried on the carrier.

The material of the carrier can be the same as conventional exhaust cleaning catalysts. In particular, a carrier having a relatively large specific surface area and excellent heat resistance can be preferably used. Preferable examples include alumina ($Al_2O_3$)-based oxides, ceria ($CeO_2$)-based oxides, titania ($TiO_2$)-based oxides, zirconia ($ZrO_2$)-based oxides, silica ($SiO_2$)-based oxides, solid solutions of these (e.g. ceria-zirconia-based composite oxides (CZ-based composite oxides)), and combinations of these. For instance, alumina-based oxides are effective from the standpoint of carrying the precious metal in a highly dispersed state. CZ-based composite oxides are effective from the standpoint of preventing depletion of oxygen. Thus, in the invention disclosed herein, at least one species among alumina-based oxides and CZ-based composite oxides can be preferably used. In particular, a carrier in which an alumina-based oxide and/or a CZ-based composite oxide accounts for 50% by mass or more (preferably 70% by mass or more, more preferably 90% by mass or more, e.g. 95% by mass or more) of the entire carrier is preferable. A particularly preferable carrier is essentially formed of an alumina-based oxide and/or a CZ-based composite oxide (e.g. 99% by mass or more of the carrier).

In other words, the carrier may comprise other component besides the oxide described above. In particular, for example, it may comprise an alkaline earth metal content (typically an alkaline earth metal oxide), a rare earth content (typically a rare earth oxide), etc., for purposes such as increasing the mechanical strength, increasing the durability (thermal stability), inhibiting sintering of the catalyst, or preventing poisoning of the catalyst. In particular, the rare earth content is preferable because it can maintain and increase the specific surface area at a high temperature without hindering the catalytic activity. As the rare earth oxide, oxides of Sc, Y, La, Ce, Pr, Nd, Sm, Eu, Gd, Tb, Dy, Ho, Er, Tm, Yb, Lu, etc., can be used. Among them, from the standpoint of the affinity to the precious metal (e.g. Rh or Pd), lanthanum oxide ($La_2O_3$) and cerium oxide ($CeO_2$) can be preferably used. As the alkaline earth metal oxide, oxides of Ca, Sr, Ba and Ra can be used. From the standpoint of increasing the affinity to the precious metal (e.g. Rh or Pd), calcium oxide (CaO) and barium oxide (BaO) can be used particularly preferably.

In a preferable embodiment disclosed herein, the carrier comprises as the first component (primary component) an alumina-based oxide and/or a CZ-based composite oxide and further comprises as the second component (secondary component) a rare earth oxide and/or an alkaline earth metal oxide. The ratio of the second component is preferably 30% by mass or less (preferably 20% by mass or less, more preferably 10% by mass or less, e.g. 1 to 5% by mass) of the entire carrier.

The characteristics of the particles constituting the carrier (carrier particles) are not particularly limited. In general, particles with a smaller average particle diameter have a larger specific surface area and have advantages in increasing the contact area with exhaust. On the other hand, when the carrier particles have an excessively large specific surface area, the carrier formed may be insufficient in structural stability (mechanical strength) and heat resistance. For these reasons, the carrier particles may usually have a specific surface area of 50 m$^2$/g to 500 m$^2$/g, for example, about 200 m$^2$/g to 400 m$^2$/g. The carrier particles may usually have an average particle diameter of 1 µm to 50 µm, for example, about 5 µm to 10 µm.

In the invention disclosed herein, as the precious metal, at least Rh-containing metal particles in which rhodium (Rh) coexists with the base metal are used. By this, for example, even at a high temperature, sintering of the precious metal can be inhibited. As a result, desirable catalytic activity can be stably obtained.

As the base metal, a metal species selected from platinum group elements excluding rhodium can be used. Specific examples include ruthenium (Ru), palladium (Pd), osmium (Os), iridium (Ir), platinum (Pt) and alloys of these metals. Rh exhibits high reduction activity, and thus, for the base metal, a highly oxidative metal (e.g. Pd and Pt, especially Pd) can be preferably used. By this, for example, as compared to an embodiment using two different metal species together as separate particles, it can more efficiently clean various toxic components in exhaust.

In the Rh-containing metal particles, the average content (coexistence ratio) of rhodium based on STEM-EDX is, with the total amount of the base metal and rhodium being 100% by mole, 0.1% by mole or greater (typically 0.2% by mole or greater, e.g. 0.4% by mole or greater, preferably 1% by mole or greater, more preferably 1.5% by mole or greater, or even 1.7% by mole or greater), but 5% by mole or less (typically 4.5% by mole or less, e.g. 4.2% by mole or less, preferably 4% by mole or less, more preferably 3% by mole or less, or even 2.5% by mole or less). According to the studies by the present inventors, when the coexistence ratio is below 0.1% by mole, the effects of this invention can be less likely to be obtained. When the coexistence ratio is above 5% by mole, the characteristics of both the base metal and rhodium are lost, resulting in rather lower cleaning abilities. With the coexistence ratio being in the ranges shown above, sintering of the precious metal can be inhibited to bring about high cleaning abilities.

As a result, even with a reduced amount of the precious metal, the art disclosed herein can consistently achieve comparable or superior cleaning abilities to conventional products. This is extremely meaningful from the standpoint of energy saving and cost reduction. In particular, with the average rhodium content (coexistence ratio) in the Rh-containing metal particles being 1% to 3% by mole (e.g. 1.5% to 2.5% by mole), notably high HC-cleaning ability and/or CO-cleaning ability can be obtained in a rich atmosphere.

From the standpoint of increasing the contact area with exhaust, it is preferable to use such Rh-containing metal particles as fine particles with sufficiently small particle diameters. The average particle diameter of the Rh-containing metal particles is usually about 1 nm to 20 nm and can be typically 10 nm or smaller, preferably 5 nm or smaller, or more preferably 3 nm or smaller, for instance, 1 nm to 3 nm. With the average particle diameter being in these ranges, active spots can be increased to make every use of the catalyst's cleaning abilities.

The precious metal disclosed herein may comprise one, two or more species of metal particles in addition to the Rh-containing metal particles. Typical examples of such metal include elements of the platinum group (namely, elemental Ru, Rh, Pd, Os, Ir and Pt). Other examples include Mn, Co, Ni, Cu, Ag, Au and alloys comprising these.

A preferable example is Rh particles. In other words, the precious metal favorably comprises elemental Rh particles in addition to the Rh-containing metal particles. The addition ratio of Rh-containing metal particles to elemental Rh particles is not particularly limited. In a preferable example, the ratio of the number of moles of the coexisting Rh particles in the Rh-containing metal particles to the number of moles of the elemental Rh is 0.001 to 0.4 (typically 0.005 to 0.35, e.g. 0.1 to 0.35). According to such an embodiment, it is possible to take advantage of the properties (e.g. inhibiting sintering of the precious metal) of the Rh-containing metal particles and the properties (e.g. increasing the NOR-cleaning ability (reduction cleaning ability)) of the elemental Rh particles in a well-balanced manner, whereby the effect to increase the performance can be produced more stably. Thus, the effects of this invention can be produced to a higher level.

When other metal particles are used together besides the Rh-containing metal particles, the precious metal can be suitably distributed in accordance with where conventional exhaust cleaning catalysts are placed and how they are formed. For example, the Rh-containing metal particles and the other metal particles can be distributed as a mixture over the entire catalyst coating layer. Alternatively, the catalyst coating layer can be formed to have two layers at the top and bottom in the thickness direction (the direction perpendicular to the axial direction of the cylinder), with the top layer comprising one metal species (e.g. elemental Rh particles) and the bottom layer comprising the other metal species (e.g. Rh-containing metal particles, in particular, Pd/Rh-containing metal particles and/or Pt/Rh-containing metal particles). Furthermore, for instance, along the exhaust flow direction, one metal species can be included (concentrated) on the upstream side and the other metal species can be included (concentrated) on the downstream side.

The precious metal content (its amount carried; when two or more metal species are used, their total amount) may vary depending on the amount of exhaust, applications, etc. Thus, it is not particularly limited. For instance, it can be 0.1% by mass or more (typically 0.2% by mass or more, e.g. 0.3% by mass or more, preferably 0.4% by mass or more), but 3% by mass or less (typically 2% by mass or less, e.g. 1% by mass or less) of the total mass of the catalyst coating layer. With too small an amount of the precious metal, desirable exhaust cleaning abilities are less likely to be obtained and emission of toxic components may occur. On the other hand, with too large an amount of the precious metal, sintering of the precious metal may proceed and desirable catalytic activity may not be stably obtained. Moreover, it also has disadvantages in terms of energy and cost. With it being in these ranges, the effects of the present invention can be produced to a high level.

<<Production Method for Exhaust Cleaning Catalyst>>

The exhaust cleaning catalyst having a configuration as described above can be produced by a production method similar to conventional methods except that at least the Rh-containing metal particles are used as the precious metal.

In a preferable embodiment, Rh-containing metal particles are first obtained. In particular, a base metal source (typically a compound comprising the base metal element, e.g. nitrate, carbonate, sulfate, etc., of the base metal) and an Rh source (typically a compound comprising Rh, e.g. rhodium nitrate, rhodium carbonate, rhodium sulfate, etc.) are mixed in a given solvent (e.g. water) and the mixture is sonicated. The sonication is preferably carried out with high frequency ultrasonic wave in a frequency range of several MHz. From the standpoint of combining the consistency and efficiency of the procedure, the sonication time can be about several minutes to several hours. Immediately after the sonication, a polymer dispersing agent is quickly added and the resultant is stirred. As the polymer dispersing agent, for instance, polyvinylpyrrolidone (PVP), carboxymethyl cellulose (CMC) and the like can be used. A desirable powder-form carrier (e.g. alumina, ceria, etc., in powder form) is then added to the dispersion. By this, a powder is formed, wherein the Rh-containing metal is carried on the surface of the carrier particles.

The prepared powder is then dispersed in a solvent. This is allowed to dry in a vacuum microwave infrared drying oven and then heated (calcined) at a high temperature. For drying, for instance, both the microwave output and infrared output can be set to several kW to several tens of kW The calcination can be carried out, for instance, at about 500° C. to 1000° C. for about 0.5 hours to 24 hours. By this, Rh-containing metal particles are prepared.

The powder thus obtained is mixed with a given solvent (e.g. water) to prepare slurry for forming catalyst coating layers. Such slurry may suitably comprise a desirable additive. Typical examples of such an additive include heretofore known binders (e.g. alumina sol, silica sol, etc.) and oxygen storage/release materials (OSC (oxygen storage capacity) materials).

A suitable substrate is then obtained and the slurry prepared above is supplied to one end of the substrate and withdrawn (suctioned) from the other end. This provides (applies) the slurry to a prescribed area of the substrate (specifically of the rib walls). The provided amount (coating amount) of the slurry is not particularly limited. It can be usually about 70 g/L-cat. to 300 g/L-cat. (e.g. 100 g/L-cat. to 200 g/L-cat.). Such a coating amount allows preferable inhibition of grain growth of the precious metal carried. It can also reduce the pressure drop while exhaust passes through the cells.

The substrate provided with the slurry is then dried at a prescribed temperature for given time period and heated (calcined). The conditions for drying and calcining the slurry wash-coated on the substrate surface may vary depending on, for instance, the shape and size of the substrate or carrier. The conditions are thus not particularly limited. Usually, after dried at about 50° C. to 120° C. (e.g. 60° C. to 100° C.) for about 1 to 10 hours, calcination can be carried out at about 400° C. to 1000° C. (e.g. 400° C. to 600° C.) for about 2 to 4 hours. According to such an embodiment, a desirable exhaust cleaning catalyst can be prepared in relatively short time.

In other words, the art disclosed herein discloses a method for producing an exhaust cleaning catalyst comprising Rh-containing metal particles. The production method comprises the following steps (1) to (4):
(1) mixing a base metal source, an Rh source and a solvent, and sonicating a resulting mixture;
(2) adding a polymer dispersing agent;
(3) drying the mixture in a vacuum microwave infrared drying oven; and
(4) calcining a resulting dry product.
According to such a production method, an exhaust cleaning catalyst disclosed herein can be produced more efficiently and consistently.

Described above is a method that first prepares a powder in which the precious metal is carried on the surface of a carrier powder and uses the powder to form a catalyst coating layer. Obviously, however, the production method is not limited to such an embodiment. For example, it is possible to first wash-coat the substrate surface with the slurry comprising the carrier powder to form a wash-coat layer and then employ an impregnation/carrying method to allow the precious metal to be carried on the surface of the wash-coat layer, and so on.

Several working examples related to this invention are described below, but this invention is not to be limited to such specific examples.

A total of 26 species of catalyst were prepared here and the exhaust cleaning abilities of the respective catalysts were compared.

(Catalyst A)

First, were mixed an aqueous palladium nitrate solution containing 10.000 mmol of Pd and an aqueous rhodium nitrate solution containing 0.250 mmol of Rh to prepare a solution mixture. The resulting solution mixture was dispersed in 1000 mL of ion-exchanged water, placed in a high frequency ultrasonic wave bath (frequency: 3 MHz) and sonicated for one hour. Immediately after the sonication, was added 0.1 g of polyvinylpyrrolidone (PVP) dissolved in 100 mL of ion-exchanged water and the resultant was stirred well. To this solution, was added 49.37 g of aluminum oxide ($Al_2O_3$) as a carrier and the resultant was stirred well. The precious metal (Rh-containing metal particles) was then allowed to be adsorbed and carried on the surface of the aluminum oxide. Subsequently, the aqueous solution was removed by suction filtration. The filtrate was analyzed by ICP emission spectrometry and the percent of amount carried on the carrier was 100% for both Pd and Rh. A powder (1) was thus obtained.

An aqueous rhodium nitrate solution containing 1.750 mmol of Rh was then dispersed in 1000 mL of ion-exchanged water and the resultant was stirred well. To this solution, was added 49.37 g of aluminum oxide ($Al_2O_3$) as a carrier and the resultant was stirred well. The precious metal (Rh) was then allowed to be adsorbed and carried on the surface of the aluminum oxide. Subsequently, the aqueous solution was removed by suction filtration. The filtrate was analyzed by ICP emission spectrometry and the percent of amount of Rh carried on the carrier was 100%. A powder (2) was thus obtained.

Hereinafter, the Rh content in the powder (1) (i.e. rhodium carried as the Rh-containing metal particles on the surface of the aluminum oxide) is referred to as the "coexisting Rh". The Rh content in the powder (2) (i.e. Rh carried by itself on the aluminum oxide surface) is referred to as the "elemental Rh."

The powder (1) and powder (2) were mixed at a weight ratio where their amounts of aluminum oxide were equal and the mixture was dispersed in 1000 mL of ion-exchanged water. The dispersion was stirred well and then dried to 90% dryness, using a vacuum microwave infrared drying oven (microwave output: 12 kW, infrared output: 3.4 kW). Subsequently, the resultant was calcined in air at 600° C. for 3 hours. The resulting powder was compacted by pressing, pulverized, and formed into pellets of 0.5 mm to 1.0 mm in particle size to obtain 10 g of a catalyst A. As for the rate (percent) of precious metal on the carrier, the amount of Pd on the carrier was 1.064% by mass and the amount of Rh on the carrier (i.e. coexisting Rh+elemental Rh) was 0.206% by mass.

(Catalyst B)

0.010 mmol of Rh (coexisting Rh) was contained in the powder (1) and 1.990 mmol of Rh (elemental Rh) was contained in the powder (2). Otherwise in the same manner as the catalyst A, 10 g of a catalyst B was obtained.

(Catalyst C)

0.050 mmol of Rh (coexisting Rh) was contained in the powder (1) and 1.950 mmol of Rh (elemental Rh) was contained in the powder (2). Otherwise in the same manner as the catalyst A, 10 g of a catalyst C was obtained.

(Catalyst D)

0.100 mmol of Rh (coexisting Rh) was contained in the powder (1) and 1.900 mmol of Rh (elemental Rh) was contained in the powder (2). Otherwise in the same manner as the catalyst A, 10 g of a catalyst D was obtained.

(Catalyst E)

0.500 mmol of Rh (coexisting Rh) was contained in the powder (1) and 1.500 mmol of Rh (elemental Rh) was contained in the powder (2). Otherwise in the same manner as the catalyst A, 10 g of a catalyst E was obtained.

(Catalyst F)

In the powders (1) and (2), as the carrier, aluminum oxide containing 5% by mass of barium oxide (BaO) (Ba—$Al_2O_3$) was used in place of the aluminum oxide. Otherwise in the same manner as the catalyst A, 10 g of a catalyst F was obtained.

(Catalyst G)

No Rh (coexisting Rh) (0.000 mmol) was added in the powder (1) and 2.000 mmol of Rh (elemental Rh) was contained in the powder (2). Otherwise in the same manner as the catalyst A, 10 g of a catalyst G was obtained.

(Catalyst H)

1.000 mmol of Rh (coexisting Rh) was contained in the powder (1) and 1.000 mmol of Rh (elemental Rh) was contained in the powder (2). Otherwise in the same manner as the catalyst A, 10 g of a catalyst H was obtained.

(Catalyst I)

1.500 mmol of Rh (coexisting Rh) was contained in the powder (1) and 0.500 mmol of Rh (elemental Rh) was contained in the powder (2). Otherwise in the same manner as the catalyst A, 10 g of a catalyst I was obtained.

(Catalyst J)

2.000 mmol of Rh (coexisting Rh) was contained in the powder (1) and no Rh (elemental Rh) (0.000 mmol) was added in the powder (2). Otherwise in the same manner as the catalyst A, 10 g of a catalyst J was obtained.

(Catalyst K)

First, were mixed an aqueous palladium nitrate solution containing 10.000 mmol of Pd and an aqueous rhodium nitrate solution containing 0.250 mmol of Rh to prepare a solution mixture. The resulting solution mixture was dispersed in 1000 mL of ion-exchanged water. To this solution, was added 49.37 g of aluminum oxide ($Al_2O_3$) as a carrier and the resultant was stirred well. The precious metal (Pd and Rh) was then allowed to be adsorbed and carried on the surface of the aluminum oxide. Subsequently, the aqueous solution was removed by suction filtration. The filtrate was analyzed by ICP emission spectrometry and the percent of amount carried on the carrier was 100% for both Pd and Rh. A powder (3) was thus obtained.

Subsequently, in ion-exchanged water, 49.37 g of aluminum oxide ($Al_2O_3$) was dispersed as a carrier. To this, was then added an aqueous rhodium nitrate solution containing 1.750 mmol of Rh. The precious metal (Rh) was then allowed to be adsorbed and carried on the surface of the aluminum oxide. Subsequently, the aqueous solution was removed by suction filtration. The filtrate was analyzed by ICP emission spectrometry and the percent of amount of Rh carried on the carrier was 100%. A powder (4) was thus obtained.

The powder (3) and powder (4) were mixed at a weight ratio where their amounts of aluminum oxide were equal and the mixture was dispersed in 1000 mL of ion-exchanged water. The dispersion was stirred well and then the aqueous solution was removed by suction filtration. The powder mixture was dried at 110° C. and then calcined in air at 600° C. for 3 hours. The resulting powder was compacted by pressing, pulverized, and formed into pellets of 0.5 mm to 1.0 mm in particle size to obtain 10 g of a catalyst K. As for the rate (percent) of precious metal on the carrier, the amount of Pd on the carrier was 1.064% by mass and the amount of Rh on the carrier (i.e. coexisting Rh+elemental Rh) was 0.206% by mass.

(Catalyst L)

In place of the powder (1), the powder (3) was used (i.e. the high frequency sonication was not carried out). Otherwise in the same manner as the catalyst A, 10 g of a catalyst L was obtained.

(Catalyst M)

As for the means of drying the mixture of the powders (1) and (2), drying was carried out in air at 110° C. (i.e. the vacuum microwave infrared drying oven was not used). Otherwise in the same manner as the catalyst A, 10 g of a catalyst M was obtained.

(Catalyst N)

In the powders (1) and (2), as the carrier, a ceria ($CeO_2$)-zirconia ($ZrO_2$) composite oxide (CZO, a solid solution of $CeO_2$ and $ZrO_2$ at 1:3 weight ratio here) was used in placed of the aluminum oxide. Otherwise in the same manner as the catalyst A, 10 g of a catalyst N was obtained.

(Catalyst O)

In the powders (1) and (2), as the carrier, CZO was used in place of the aluminum oxide. Otherwise in the same manner as the catalyst B, 10 g of a catalyst O was obtained.

(Catalyst P)

In the powders (1) and (2), as the carrier, CZO was used in place of the aluminum oxide. Otherwise in the same manner as the catalyst C, 10 g of a catalyst P was obtained.

(Catalyst Q)

In the powders (1) and (2), as the carrier, CZO was used in place of the aluminum oxide. Otherwise in the same manner as the catalyst D, 10 g of a catalyst Q was obtained.

(Catalyst R)

In the powders (1) and (2), as the carrier, CZO was used in place of the aluminum oxide. Otherwise in the same manner as the catalyst E, 10 g of a catalyst R was obtained.

(Catalyst S)

In the powders (1) and (2), as the carrier, CZO containing 5% by mass of lanthanum (La) (La-CZO) was used in place of the aluminum oxide. Otherwise in the same manner as the catalyst F, 10 g of a catalyst S was obtained.

(Catalyst T)

In the powders (1) and (2), as the carrier, CZO was used in place of the aluminum oxide. Otherwise in the same manner as the catalyst G, 10 g of a catalyst T was obtained.

(Catalyst U)

In the powders (1) and (2), as the carrier, CZO was used in place of the aluminum oxide. Otherwise in the same manner as the catalyst H, 10 g of a catalyst U was obtained.

(Catalyst V)

In the powders (1) and (2), as the carrier, CZO was used in place of the aluminum oxide. Otherwise in the same manner as the catalyst I, 10 g of a catalyst V was obtained.

(Catalyst W)

In the powders (1) and (2), as the carrier, CZO was used in place of the aluminum oxide. Otherwise in the same manner as the catalyst J, 10 g of a catalyst W was obtained.

(Catalyst X)

In the powders (3) and (4), as the carrier, CZO was used in place of the aluminum oxide. Otherwise in the same manner as the catalyst K, 10 g of a catalyst X was obtained.

(Catalyst Y)

In the powders (1) and (2), as the carrier, CZO was used in place of the aluminum oxide. Otherwise in the same manner as the catalyst L, 10 g of a catalyst Y was obtained.

(Catalyst Z)

In the powders (1) and (2), as the carrier, CZO was used in place of the aluminum oxide. Otherwise in the same manner as the catalyst M, 10 g of a catalyst Z was obtained.

Table 1 below summarizes the characteristics of the catalysts of the respective examples.

resulting 100 coexistence ratio values to check for the validity of the value at a significance level of 5%. When the largest value was found invalid, the same test was applied to the next largest value. This was repeated until the largest valid value was found. The average rhodium content was then determined based on the value tested valid. The results are shown under the "coexistence ratio" in Table 1.

As evident from Table 1, the coexistence ratio was 0.00% by mole for the catalysts K and Z for which the vacuum microwave infrared drying oven was not used. On the contrary, with respect to the samples excluding the catalysts K and Z, the coexisting Rh (mmol) was found to be related to the coexistence ratio (Rh content) in the Rh-containing metal particles. From this, it was found that to adjust the coexistence ratio, the amount of Rh in the powder (1) could be adjusted.

TABLE 1

Characteristics of catalysts

| Species | Composition of catalyst | | | | | | | Average particle diameter | |
|---|---|---|---|---|---|---|---|---|---|
| | Pd (mmol) | Total Rh (mmol) | Coex. Rh | Elem. Rh | Coex. ratio (mol %) | Coex. Rh/elem. Rh | Carrier | Initial (nm) | Post-endurance (nm) |
| A | 10 | 2 | 0.25 | 1.75 | 1.98 | 0.143 | $Al_2O_3$ | 1.7 | 39.0 |
| B | 10 | 2 | 0.01 | 1.99 | 0.10 | 0.005 | $Al_2O_3$ | 1.5 | 40.3 |
| C | 10 | 2 | 0.05 | 1.95 | 0.36 | 0.026 | $Al_2O_3$ | 1.6 | 40.3 |
| D | 10 | 2 | 0.10 | 1.90 | 0.76 | 0.053 | $Al_2O_3$ | 1.6 | 40.0 |
| E | 10 | 2 | 0.50 | 1.50 | 4.11 | 0.333 | $Al_2O_3$ | 1.8 | 37.3 |
| F | 10 | 2 | 0.25 | 1.75 | 2.03 | 0.143 | $Ba-Al_2O_3$ | 1.7 | 38.8 |
| G | 10 | 2 | 0.00 | 2.00 | 0.00 | 0.000 | $Al_2O_3$ | 1.4 | 40.7 |
| H | 10 | 2 | 1.00 | 1.00 | 8.27 | 1.000 | $Al_2O_3$ | 1.9 | 34.6 |
| I | 10 | 2 | 1.50 | 0.50 | 12.49 | 3.000 | $Al_2O_3$ | 2.1 | 32.8 |
| J | 10 | 2 | 2.00 | 0.00 | 16.65 | — | $Al_2O_3$ | 2.4 | 30.7 |
| K | 10 | 2 | 0.25 | 1.75 | 0.00 | 0.143 | $Al_2O_3$ | 2.1 | 40.6 |
| L | 10 | 2 | 0.25 | 1.75 | 0.05 | 0.143 | $Al_2O_3$ | 1.8 | 40.1 |
| M | 10 | 2 | 0.25 | 1.75 | 0.05 | 0.143 | $Al_2O_3$ | 2.3 | 40.7 |
| N | 10 | 2 | 0.25 | 1.75 | 2.03 | 0.143 | CZO | 1.8 | 49.0 |
| O | 10 | 2 | 0.01 | 1.99 | 0.10 | 0.005 | CZO | 1.6 | 50.1 |
| P | 10 | 2 | 0.05 | 1.95 | 0.41 | 0.026 | CZO | 1.7 | 50.3 |
| Q | 10 | 2 | 0.10 | 1.90 | 0.81 | 0.053 | CZO | 1.8 | 49.4 |
| R | 10 | 2 | 0.50 | 1.50 | 4.16 | 0.333 | CZO | 2.1 | 47.4 |
| S | 10 | 2 | 0.25 | 1.75 | 1.78 | 0.143 | La-CZO | 2.0 | 49.2 |
| T | 10 | 2 | 0.00 | 2.00 | 0.00 | 0.000 | CZO | 1.6 | 50.0 |
| U | 10 | 2 | 1.00 | 1.00 | 8.02 | 1.000 | CZO | 2.0 | 45.1 |
| V | 10 | 2 | 1.50 | 0.50 | 12.54 | 3.000 | CZO | 2.2 | 43.3 |
| W | 10 | 2 | 2.00 | 0.00 | 16.55 | — | CZO | 2.9 | 40.9 |
| X | 10 | 2 | 0.25 | 1.75 | 0.00 | 0.143 | CZO | 2.2 | 50.0 |
| Y | 10 | 2 | 0.25 | 1.75 | 0.05 | 0.143 | CZO | 2.1 | 50.5 |
| Z | 10 | 2 | 0.25 | 1.75 | 0.05 | 0.143 | CZO | 2.7 | 50.2 |

*CZO represents a ceria-zirconia composite oxide.

<<Assessment of Coexistence Ratio>>

With respect to the catalysts A to Z, the respective powders prior to the formation of pellets were observed, using a scanning transmission electron microscope (STEM). During observations at a magnification of 1,000,000 times, a search was made for a spot where only one precious metal particle was observable in the viewing field under observation, and with respect to the field (spot), quantitative analysis of Pd and Rh was carried out by means of energy dispersive X-ray spectroscopy (EDX) elemental mapping. The coexistence ratio for Pd and Rh was determined from the next equation: coexistence ratio (% by mole)=(amount of Rh)/(amount of Pd+amount of Rh)×100. The same procedure was repeated for a total of 100 viewing fields. The Smirnov-Grubbs test was applied to the largest value among the <<Analysis of Initial Average Particle Diameter>>

With respect to the catalyst particles whose coexistence ratio was tested valid from the results of the Smirnov-Grubbs test in the assessment of coexistence ratio, the particle diameters were determined according to the next equation: particle diameter (nm)=$(D_L+D_S)/2$ (wherein, $D_L$ is the length of the longest straight line that can be drawn from one point on the outline of a given catalyst particle to another point thereon; and Ds is the length of the shortest straight line that can be drawn from one point on the outline of the given catalyst particle to another point thereon). In Table 1, for each catalyst, the average of the particle diameters obtained is shown as the initial particle diameter of the Rh-containing metal particles.

As shown in Table 1, the catalysts A to Z all had an average particle diameter in a range of 1 nm to 5 nm (more precisely 1 nm to 3 nm).

<<Evaluation of Cleaning Abilities>>

Figure 2:
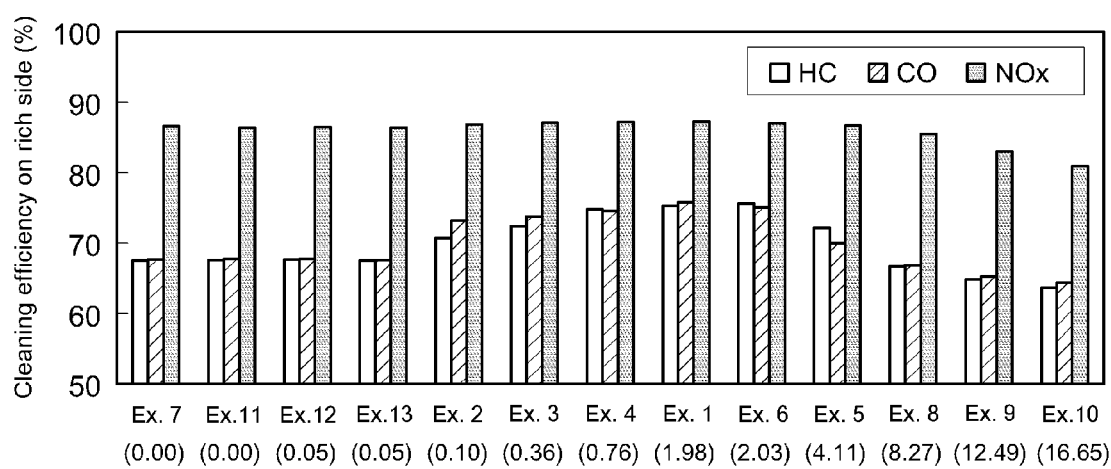
FIG. 2 shows a graph that compares catalytic activities of the exhaust cleaning catalysts according to Examples 1 to 13 in a rich atmosphere.
Figure 3:
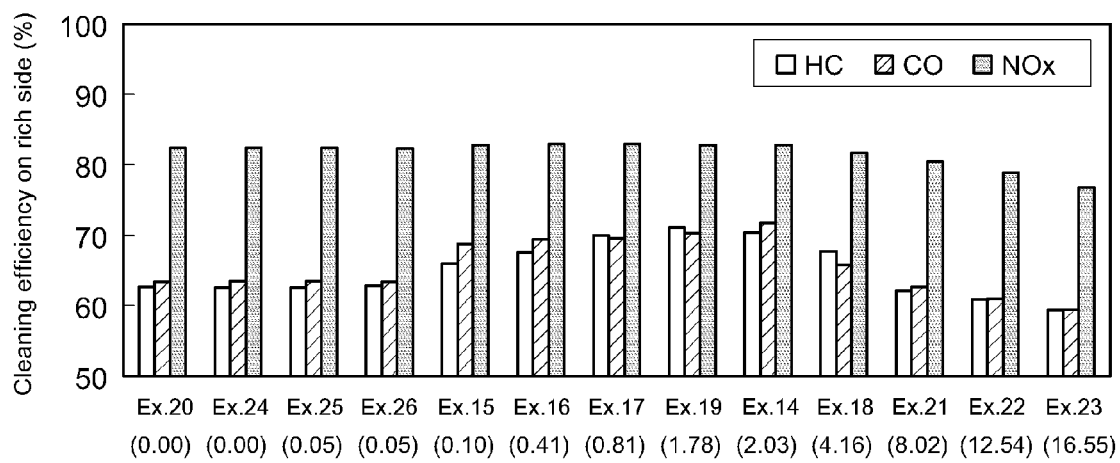
FIG. 3 shows a graph that compares catalytic activities of the exhaust cleaning catalysts according to Examples 14 to 26 in a rich atmosphere.

The catalysts (A to Z) obtained above were placed in a ceramic boat and then in a tubular heater, and were subjected to an endurance test where, at 1000° C., rich gas with 4% carbon monoxide (CO) in nitrogen and lean gas with 2% oxygen ($O_2$) in nitrogen were passed alternately for a period of 5 minutes at a flow rate of 1 L/min for a total of 5 hours. After this, the exhaust-cleaning efficiency was evaluated. Specifically, the catalysts were first placed in a normal-pressure fixed-bed circulation reactor, and while stoichiometric model gas (A/F=14.6) was passed with the temperature maintained at 400° C., the concentrations of HC (propylene here), CO and NO were measured at the outlet port. The same evaluation was conducted, using rich model gas (A/F=14.1) and lean model gas (A/F=15.1). Table 2 shows the results as Examples 1 to 26. FIG. 2 and FIG. 3 show the cleaning efficiency in the rich atmosphere.

<<Analysis of Post-Endurance Average Particle Diameter>>

Figure 4:
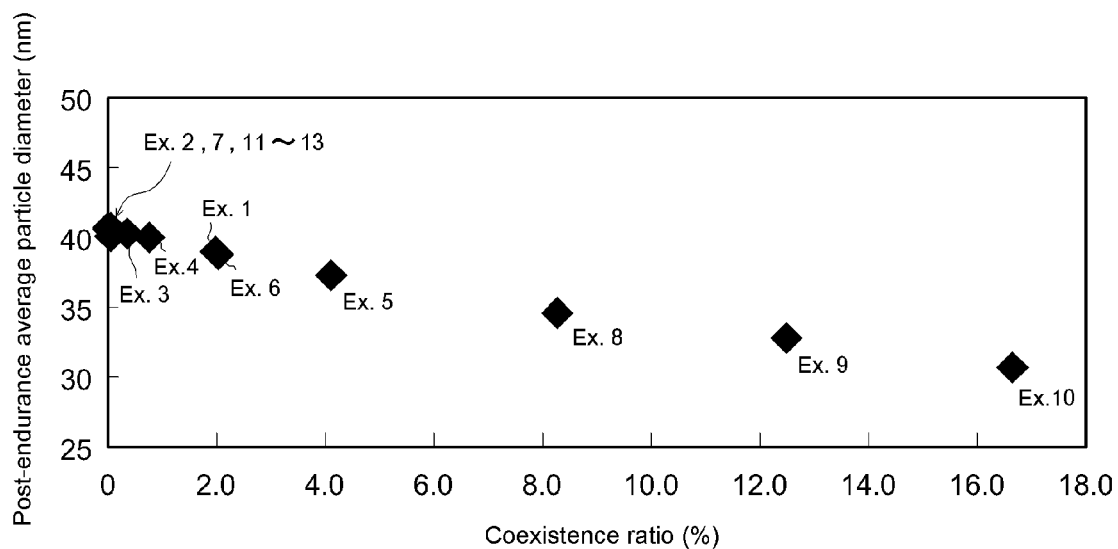
FIG. 4 shows a graph that illustrates the relationship between the coexistence ratios of catalysts A to M and their post-endurance average particle diameters.
Figure 5:
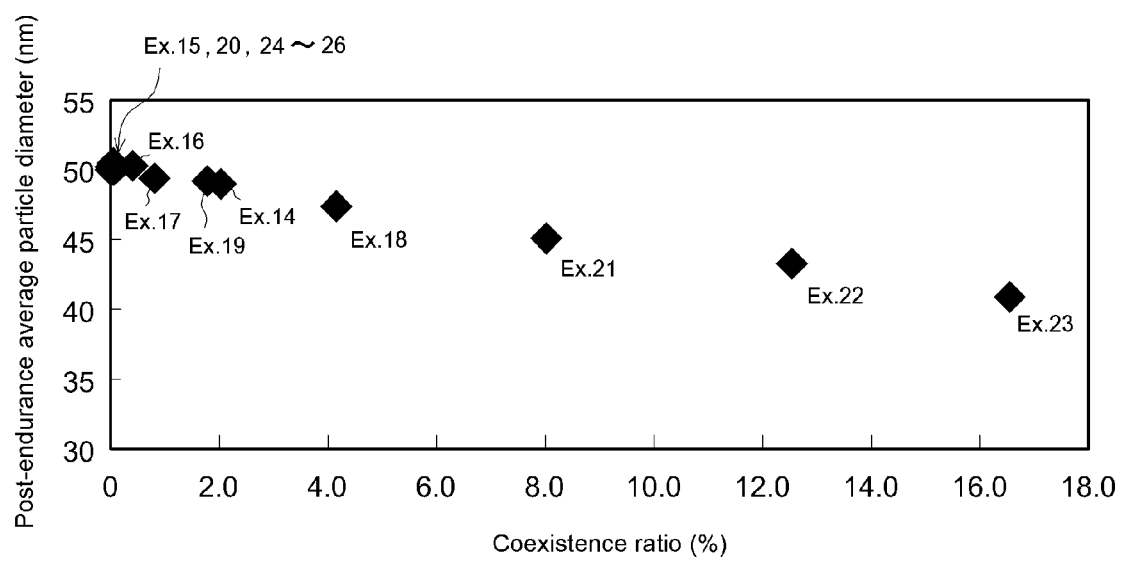
FIG. 5 shows a graph that illustrates the relationship between the coexistence ratios of catalysts N to Z and their post-endurance average particle diameters.

The catalyst particles were collected from the catalyst after the endurance test and observed by STEM in the same manner as above to determine the particle diameters. Table 1 shows the average of the particle diameters obtained as the post-endurance particle diameter of the Rh-containing metal particles in each catalyst. FIG. 4 and FIG. 5 show the relationship between the coexistence ratio and the post-endurance particle diameter.

to 2.5% by mole), the HC-cleaning efficiency and the CO-cleaning efficiency were as high as or higher than 75%.

On the other hand, Examples 12 and 13 with coexistence ratios below 0.05% by mole exhibited comparable cleaning abilities to Example 7 with a coexistence ratio of 0% by mole; and Examples 24 and 25 with coexistence ratios below 0.05% by mole exhibited comparable cleaning abilities to Example 20 with a coexistence ratio of 0% by mole, showing no notable effects of the added Rh-containing metal particles. In Examples 8 to 10 and 21 to 23 with coexistence ratios at or above 8% by mole, the cleaning abilities greatly decreased. A cause for this may be the loss of the characteristics of both Pd and Rh due to the excessively high coexistence ratios. These results show the technical significance of this invention.

In comparison of Examples 1 to 13 using elemental alumina with Examples 14 to 26 using CZO, relatively high catalytic activity was shown when alumina was used, but the coexistence ratio and catalytic activity showed similar tendencies with both carriers. In other words, it has been found that the invention disclosed herein can be applied to various types of carrier.

Discussed next is the relationship between the post-endurance coexistence ratio and the average particle diameter of the catalyst.

TABLE 2

| | | Exhaust-cleaning efficiency (%) | | | | | | | | |
|---|---|---|---|---|---|---|---|---|---|---|
| | | Rich (A/F = 14.1) | | | Stoichiometric (A/F = 14.6) | | | Lean (A/F = 15.1) | | |
| | Catalyst | HC | CO | $NO_x$ | HC | CO | $NO_x$ | HC | CO | $NO_x$ |
| Ex. 1 | A | 75.3 | 75.8 | 87.3 | 89.6 | 89.8 | 88.2 | 91.2 | 90.7 | 61.3 |
| Ex. 2 | B | 70.7 | 73.2 | 86.9 | 89.0 | 89.1 | 88.1 | 90.3 | 90.4 | 61.3 |
| Ex. 3 | C | 72.4 | 73.8 | 87.1 | 89.3 | 89.6 | 88.2 | 90.7 | 90.7 | 61.4 |
| Ex. 4 | D | 74.8 | 74.6 | 87.2 | 89.5 | 89.8 | 88.3 | 91.0 | 90.9 | 61.5 |
| Ex. 5 | E | 72.2 | 70.0 | 86.7 | 89.2 | 89.4 | 88.0 | 90.5 | 90.6 | 61.0 |
| Ex. 6 | F | 75.6 | 75.1 | 87.0 | 89.5 | 89.6 | 88.2 | 91.1 | 90.8 | 61.6 |
| Ex. 7 | G | 67.5 | 67.7 | 86.6 | 86.4 | 86.6 | 85.7 | 90.0 | 90.0 | 60.6 |
| Ex. 8 | H | 66.7 | 66.9 | 85.5 | 85.6 | 85.8 | 84.4 | 89.5 | 89.7 | 59.2 |
| Ex. 9 | I | 64.9 | 65.3 | 83.0 | 84.0 | 84.2 | 81.9 | 88.1 | 88.3 | 57.0 |
| Ex. 10 | J | 63.7 | 64.4 | 80.9 | 82.8 | 83.2 | 80.1 | 86.4 | 87.0 | 55.3 |
| Ex. 11 | K | 67.6 | 67.8 | 86.4 | 86.4 | 86.5 | 85.5 | 89.9 | 90.0 | 60.6 |
| Ex. 12 | L | 67.7 | 67.8 | 86.5 | 86.3 | 86.8 | 85.7 | 89.9 | 90.0 | 60.4 |
| Ex. 13 | M | 67.5 | 67.6 | 86.4 | 86.3 | 86.4 | 85.5 | 90.2 | 90.1 | 60.6 |
| Ex. 14 | N | 70.4 | 71.7 | 82.8 | 85.0 | 85.2 | 83.7 | 86.3 | 86.5 | 57.1 |
| Ex. 15 | O | 66.0 | 68.8 | 82.8 | 84.6 | 84.1 | 83.3 | 85.5 | 85.4 | 57.0 |
| Ex. 16 | P | 67.6 | 69.4 | 83.0 | 85.1 | 84.6 | 83.4 | 86.0 | 86.3 | 56.5 |
| Ex. 17 | Q | 70.0 | 69.6 | 83.0 | 84.6 | 84.8 | 83.9 | 86.1 | 86.6 | 57.2 |
| Ex. 18 | R | 67.7 | 65.8 | 81.7 | 84.9 | 85.4 | 83.8 | 86.5 | 86.1 | 56.4 |
| Ex. 19 | S | 71.1 | 70.3 | 82.8 | 85.4 | 85.2 | 84.0 | 87.0 | 86.7 | 57.1 |
| Ex. 20 | T | 62.7 | 63.4 | 82.4 | 82.3 | 82.0 | 80.7 | 85.9 | 85.0 | 55.7 |
| Ex. 21 | U | 62.1 | 62.7 | 80.5 | 81.4 | 81.8 | 79.8 | 85.3 | 85.6 | 54.3 |
| Ex. 22 | V | 60.9 | 61.0 | 78.9 | 79.8 | 79.8 | 77.6 | 83.3 | 84.3 | 52.6 |
| Ex. 23 | W | 59.4 | 59.5 | 76.8 | 78.4 | 78.9 | 75.8 | 81.4 | 82.6 | 50.4 |
| Ex. 24 | X | 62.6 | 63.5 | 82.4 | 82.2 | 81.9 | 80.5 | 85.9 | 85.1 | 55.6 |
| Ex. 25 | Y | 62.6 | 63.5 | 82.4 | 82.2 | 81.8 | 80.6 | 85.8 | 85.2 | 55.7 |
| Ex. 26 | Z | 62.8 | 63.4 | 82.3 | 82.4 | 81.8 | 80.6 | 85.7 | 84.8 | 55.5 |

Discussed first is how the coexistence ratio is related to the catalytic activity.

As shown in Table 2, FIG. 2 and FIG. 3, among the examples studied, excellent cleaning abilities were obtained in Examples 1 to 6 and 14 to 19 with 0.1% to 5% by mole coexistence ratios. In particular, the cleaning abilities in the rich atmosphere were greatly increased. For instance, the HC-cleaning efficiency and the CO-cleaning efficiency were at least 70%. Especially, when the coexistence ratio was 1% to 3% by mole (typically 1.5% to 2.5% by mole, e.g. 1.7%

As shown in Tables 1 and 2 as well as in FIG. 4 and FIG. 5, with increasing coexistence ratio, the catalyst had a smaller average particle diameter after the endurance test. This may be because sintering of the precious metal was effectively inhibited in the catalyst coating layer.

Specific embodiments of the present invention are described above, but these are merely for illustration and do not limit the scope of the claims. The art according to the claims include various modifications and changes made to the specific embodiments illustrated above.

REFERENCE SIGNS LIST 1 substrate
2 through holes (cells)
4 partitions (rib walls)
10 exhaust cleaning catalyst

The invention claimed is:

1. An exhaust cleaning catalyst comprising a substrate and a catalyst coating layer on the substrate, wherein
the catalyst coating layer comprises a precious metal that serves as an oxidation and/or reduction catalyst, and a carrier that carries the precious metal,
the precious metal comprises Rh-containing metal particles in which rhodium (Rh) coexists with a base metal selected among platinum group elements excluding rhodium,
each of the Rh-containing metal particles has both a crystal phase of the base metal and a crystal phase of Rh, and
the Rh-containing metal particles has an average rhodium content of 0.1% to 5% by mole with the total amount of the base metal and rhodium being 100% by mole based on energy dispersive X-ray spectrometry analysis of a scanning transmission electron microscopy image.

2. The exhaust cleaning catalyst according to claim 1, wherein the base metal is palladium.

3. The exhaust cleaning catalyst according to claim 1, wherein the average rhodium content is 1% to 3% by mole.

4. The exhaust cleaning catalyst according to claim 1, wherein the Rh-containing metal particles have an average particle diameter of 1 nm to 5 nm based on scanning transmission electron microscopy.

5. The exhaust cleaning catalyst according to claim 1, wherein the carrier comprises an alumina-based oxide and/or a ceria-zirconia-based composite oxide.

6. The exhaust cleaning catalyst according to claim 5, wherein the carrier further comprises a rare earth oxide and/or an alkaline earth metal oxide.

7. The exhaust cleaning catalyst according to claim 1, wherein the precious metal comprises elemental Rh particles in addition to the Rh-containing metal particles.

8. The exhaust cleaning catalyst according to claim 7 having a ratio of number of moles of Rh particles that coexist in the Rh-containing metal particles to number of moles of the elemental Rh of 0.001 to 0.4.

9. The exhaust cleaning catalyst according to claim 1, wherein the average rhodium content is 1.5% to 2.5% by mole.

10. The exhaust cleaning catalyst according to claim 1, wherein the Rh-containing metal particles have an average particle diameter of 1 nm to 3 nm based on scanning transmission electron microscopy.

11. The exhaust cleaning catalyst according to claim 7 having a ratio of number of moles of Rh particles that coexist in the Rh-containing metal particles to number of moles of the elemental Rh of 0.005 to 0.35.

12. The exhaust cleaning catalyst according to claim 7 having a ratio of number of moles of Rh particles that coexist in the Rh-containing metal particles to number of moles of the elemental Rh of 0.001 to 0.35.

* * * * *